April 7, 1970  L. E. REYNOLDS ET AL  3,505,530
APPARATUS AND METHOD TO MEASURE THE AMOUNT OF YARN ON A BOBBIN
Filed April 23, 1968  3 Sheets-Sheet 1
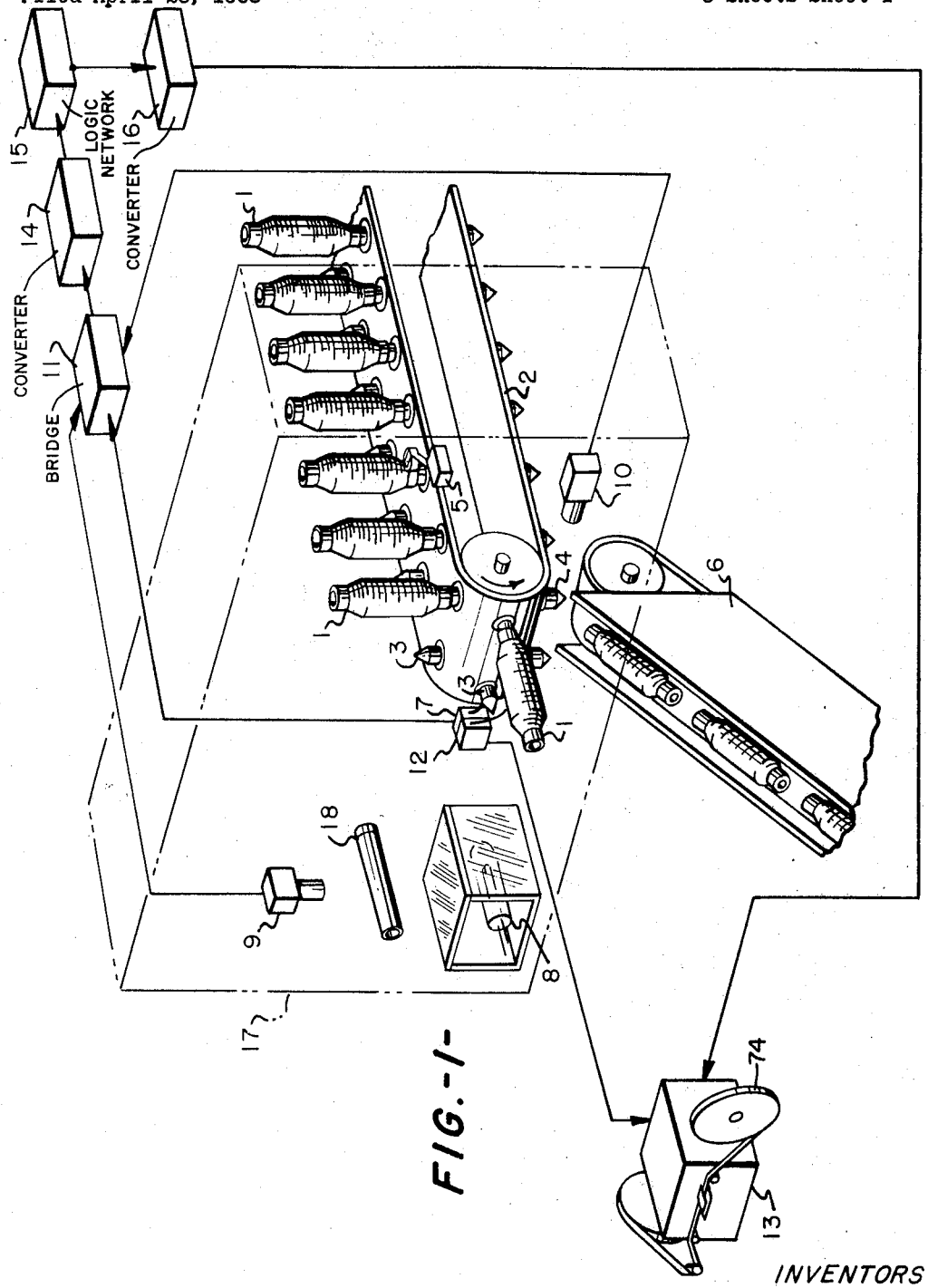
FIG.-1-
INVENTORS
LESLIE E. REYNOLDS
WEIR E. WHARTON
BY
ATTORNEY

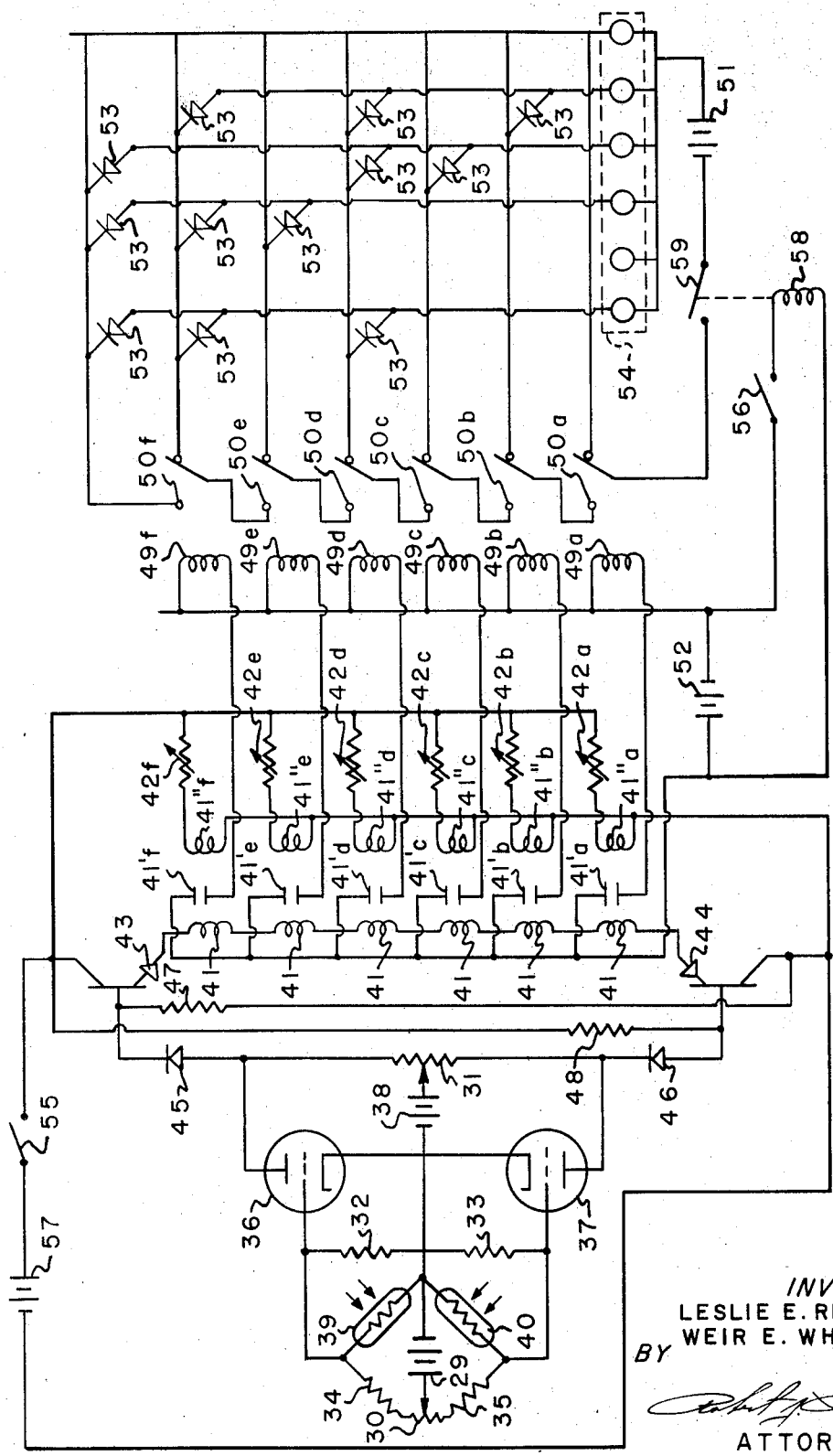
FIG. -2-
INVENTORS
LESLIE E. REYNOLDS
WEIR E. WHARTON
BY
ATTORNEY

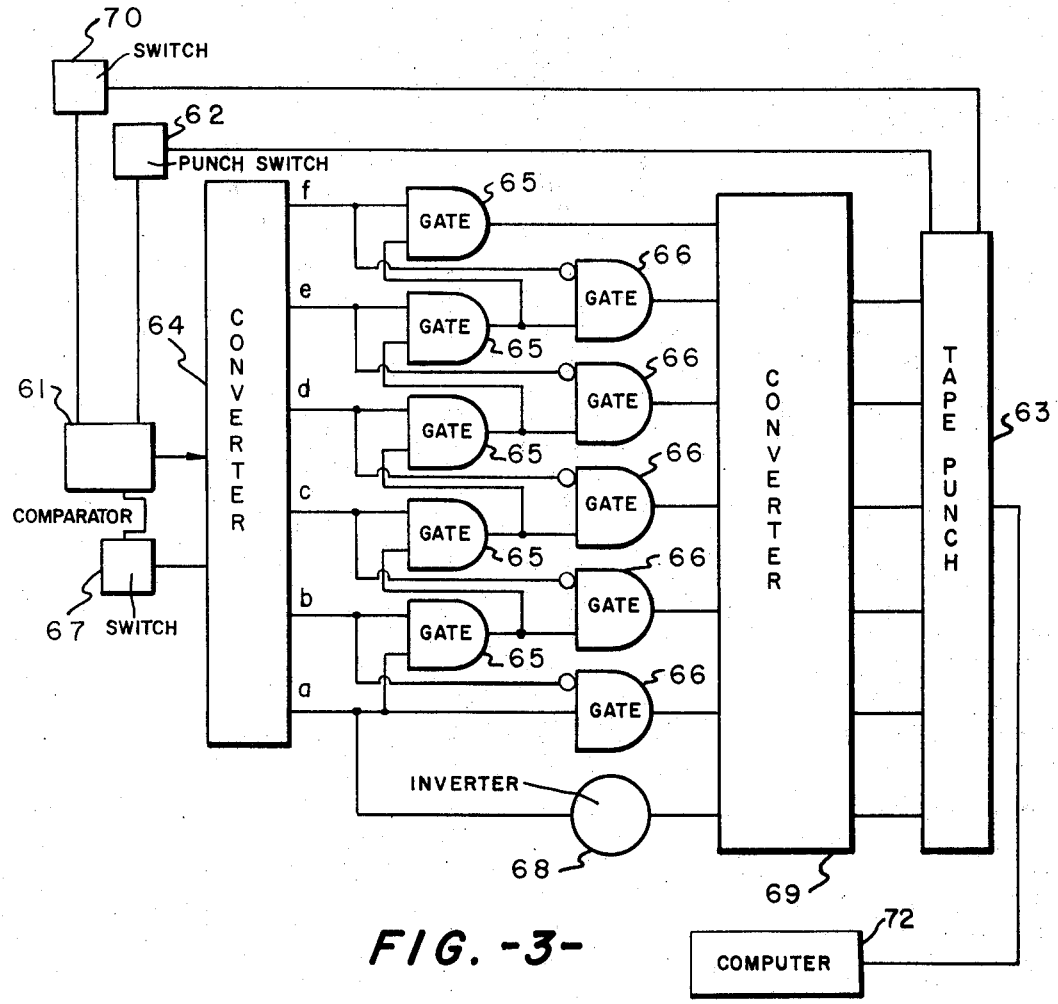
FIG. -3-

United States Patent Office 3,505,530
Patented Apr. 7, 1970

3,505,530
APPARATUS AND METHOD TO MEASURE THE AMOUNT OF YARN ON A BOBBIN
Leslie E. Reynolds, Greenville, and Weir E. Wharton, Spartanburg, S.C., assignors to Deering Milliken Research Corporation, Spartanburg, S.C., a corporation of South Carolina
Continuation-in-part of application Ser. No. 414,252, Nov. 27, 1964. This application Apr. 23, 1968, Ser. No. 725,584
Int. Cl. G06m 7/00; H01j 39/12; G01n 21/30
U.S. Cl. 250—223          7 Claims

ABSTRACT OF THE DISCLOSURE

Apparatus and method to compare the amount of yarn on a bobbin to a standard, photoelectrically, and use the signal obtained to locate exactly spindles which are not functioning properly.

This application is a continuation-in-part of our application, Ser. No. 414,252, filed Nov. 27, 1964, now abandoned.

This invention relates to a photoelectric comparator and more specifically to a recording photoelectric comparator suitable for inspecting a plurality of homologous objects and recording data essential to the determination of defects in the manufacture of such objects.

Photoelectric devices for determining size variations are well known to the electronics art. It is sometimes important, however, to know not merely the size variations existing among a plurality of inspected members but rather to have as a result of such inspection a means for determining one or more manufacturing malfunctions occurring at a distant point or points. Determinations of this nature are important in automated manufacturing areas such as for instance yarn wound bobbins wherein analysis of bobbin size bears a direct relationship to malfunctions in automated bobbin winding operations. Another area in which such determinations are important is in visible container filling operations wherein variations in quantities of liquids placed in containers have a direct relatonship to malfunctions occurring at various liquid filling stations. Because of the increased usage of fully automated computer controlled manufacturing operations it is also important that the intelligence recorded as a result of a photoelectric analysis be recorded in a manner which is intelligible to computer systems, that is to say recorded in a binary system.

The need for binary intelligence is due to the fact that the decimal counting method is not the optimum method to be used with electronic computer components, such as relays, vacuum tubes, transistors, ferrite memory cores and the like. All of these electrical components basically have two stable states. Although, some devices can be designed to have more than two stable states, the use of binary digital devices is largely dictated by engineering considerations leading to a higher degree of reliability. The binary number system, to the base, or radix, two, is therefore employed in computer systems and it is necessary to convert externally derived quantities or magnitudes expressed in the decimal system (base 10), for use in such systems.

It is therefore an object of this invention to provide an apparatus of the photoelectric comparator type which will record comparisons in a manner such that malfunctions occurring at a remote point can be determined.

It is a further object of this invention to provide a process for obtaining photoelectric comparisons and recording the comparisons in terms of binary intelligence.

It is an additional object of this invention to provide an apparatus of the photoelectric comparator type which will record comparisons in terms of a computer intelligible binary system.

It is another object of this invention to provide an apparatus suitable for detection of ends down in bobbin winding operations.

It is still another object of this invention to provide an apparatus suitable for determination of ends down in bobbin winding operations carried out on equipment employing automatic doffing and donning arrangements.

These and other objects of the invention will become more apparent from the following description:

It has now been discovered that a photoelectric comparator suitable for inspecting the dimensions of a plurality of objects and recording data suitable for the determination of malfunctions in the manufacture of the inspected objects at one or more remote points, may be had by placing in circuit with a photoelectric comparator suitable for continuously determining by means of a plurality of measurements, the size of the plurality of objects, an analog-to-digital converter which produces a pulse output for each discreet level up to and including the highest level represented by the signal from the photoelectric comparator. The pulse or pulses from the analog-to-digital converter are fed into a network of logic circuits which is preferably a plurality of gate members and still more preferably a plurality of single-pole double-throw switches. The single pulse emanating from the logic network is then converted from decimal intelligence to binary intelligence by passage through a converter means such as for instance a standard diode matrix and the output employed to actuate a suitable recording means such as for instance tape punch recorders, IBM cards and the like.

A better understanding of the invention may be had from a discussion of the accompanying drawings in which:

FIGURE 1 is a schematic partial phantom view of the photoelectric comparator device of this invention employed in conjunction with the doffing assembly of a bobbin winding operation.

FIGURE 2 is a circuit diagram of a photoelectric comparator of this invention.

FIGURE 3 is a block diagram of the photoelectric comparator of this invention.

Turning to FIGURE 1 of the drawings, yarn wound bobbin members 1 are mounted on continuous conveyor belt member 2. It should be understood that while the photoelectric comparator of this invention is adaptable for use in a wide variety of manufacturing operations the photoelectric comparator of this invention is especially suitable for use in conjunction with automatic bobbin doffing apparatus such as disclosed in U.S. Patents Nos. 3,112,601; 3,116,586; and 3,123,967. Conveyor belt member 2 is an assembly such as is typical of the aforementioned patented devices. Belt member 2 is equipped with bobbin mounting or stud members 3 and 4 and with switch member 5 which is employed to indicate the initiation and termination of a bobbin doffing cycle. As yarn wound bobbin members 1 are progresed toward chute member 6, stud member 3 which is always void of bobbins in the doffing cycle will make contact with the feeler projecting from switch member 7 thereby indicating that a bobbin member 1 is in position to be viewed by the photoelectric comparator and also placing the photoelectric comparator in circuit. The photoelectric comparator circuit which is completed by actuation of switch member 7 consists of a single light source 8, photoelectric cells 9 and 10 and bridge member 11. Light emanating from light source 8 to photoelectric cell 9 is diminished by yarn free bobbin member 18 thereby providing a reference constant. Light emanating from light source 8 toward yarn wound bobbin 1 is diminished to a greater or lesser extent depending upon the quantity of yarn on each bobbin member 1 thereby projecting an amount of light which may vary from sample to sample upon photoelectric cell member 10. The currents emanating from photoelectric cell 9 and the photoelectric cell 10 are then fed into bridge member 11 with the degree of unbalanced existing between the two photoelectric cells being directly proportional to the amount of yarn on yarn wound bobbin member 1. As stud member 3 progresses in the direction of chute 6 a projecting feeler from switch member 12 is contacted and recording means 13 is placed in circuit. The mechanical arrangement of the feeler members projecting from switch members 7 and 12 is such that stud member 3 will remain in contact with the feeler member of switch member 7 throughout the time interval of contact between stud member 3 and the feeler member of switch member 12. The mechanical arrangement of the feeler members of switch members 7 and 12 is also such that stud member 3 will lose contact with the feeler member of switch member 12 prior to losing contact with the feeler member of switch member 7. The mechanical arrangement of switch members 7 and 12 is designed so as to prevent the signal from the photoelectric comparison from being lost before it is recorded. While recording means 13 may be any of a wide variety of suitable recording devices, it has been found that motorized tape punch members are especially suitable for purposes of this invention. The intelligence placed upon the recording tape of tape punch member 13 is determined by the signal emanating from bridge member 11. The signal from bridge member 11 after suitable amplification is passed into analog-to-digital converter member 14 which is in circuit with logic network 15. The decimal intelligence obtained from logic network 15 is then translated into binary intelligence by decimal-to-binary converter member 16. The outputs from converter member 16 is then translated into the correct number of tape punches by tape punch member 13. It should be understood that the apparatus of FIGURE 1 is shown in phantom view for ease of illustration and that the photoelectric cell and lamp assembly must be contained within housing member 17. Housing member 17 is, of course, necessary in order to prevent extraneous light sources from interfering with the accuracy of the analytical system. As previously stated, switch member 5 indicates through suitable circuitry the initiation and termination of each doffing cycle, a reference to which is made upon the recording tape of tape punch member 13. For ease of illustration, the wiring of switch member 5 has not been shown while the wiring of the other electrical components has merely been set forth in flow diagram form. The notation on the tape of tape punch member 13 allows the size measurement of each one of bobbin members 1 to be correlated to the conditions existing at the yarn winding stations of each of the respective yarn wound bobbins. The tape of tape punch member 13 contains as intelligence a certain number of punches for each bobbin member. The number of punches correspond to the amount of yarn contained on each bobbin. If, for instance, a bobbin is viewed which has a reduced amount of yarn wound therein as a result of a yarn break in the winding operation, a different intelligence will be punched upon the tape than that intelligence which would represent a full yarn wound bobbin.

As may be noted from the foregoing description, the apparatus of this invention may be conveniently broken down into five distanct units which are (a) the photoelectric comparator, (b) the analog-to-digital converter, (c) the logic network, (d) the decimal-to-binary converter and (e) the recording device.

PHOTOELECTRIC COMPARATOR

The photoelectric comparator as can be seen in FIGURE 2 of the drawings is a standard type assembly wherein a pair of photoconductive photoelectric cells 39 and 40 are employed. The current for photoelectric cells 39 and 40 is conveniently provided by a current source member 38 which may be a dry cell. Photoelectric cell members 39 and 40 are also in circuit with bridge amplifier tube members 36 and 37 respectively. Photoelectric cells 39 and 40 are in a bridge circuit with resistors 34 and 35 and variable resistor 30 and also in circuit with resistors 32 and 33. Balance of the bridge depends upon the effect of light upon the output of photocells 39 and 40. Exact balance of light intensity under zero conditions is achieved electrically by adjustment of the tap on variable resistor member 30 which is in circuit with power supply 29. After the zero adjustment is made, the degree of unbalance which exists between the output of photocell 39 and the output of photocell 40 is caused by the differences in amounts of light blocked by the reference standard such as an empty bobbin and the amount of light blocked by a yarn wound bobbin. The amount of current flow is amplified by bridge amplifier tubes 36 and 37 and the current passed to the analog-to-digital converter. Should an unbalanced condition in the circuit be due to nonuniformities existing between bridge amplifier tube 36 and bridge amplifier tube 37, the zero adjustment may be restored by selection of the proper tap on variable resistor 31 which is in circuit with power supply 38.

ANALOG-TO-DIGITAL CONVERTER

As seen in FIGURE 2 of the drawings the analog-to-digital converter contains six reed relay signal coils 41. Each of the reed relay signal coil members 41 have a corresponding latching coil 41' (individual latching coils being numbered serially from $a$ to $f$) connected to a corresponding rheostat member 42 (individual rheostat members being numbered serially from $a$ to $f$). Latching coil members 41' are able to maintain the closure of reed switch members 41" (individual reed switch members being numbered serially from $a$ to $f$) but are unable to initiate the switch closure without the aid of signal coil 41. Since all of signal coils 41 are in series all have the same current. Consequently at any instant all of signal coil members 41 are contributing the same amount of magnetic force for closing their corresponding reed switches 41". By adjusting rheostat members 42 for different current levels in each of the corresponding latching coil members 41', the sensitivity of each latching relay 41' is adjusted to cause switch closure at different signal current. The first 41'a switch closes at a lower current than the 41'b switch with the progression continuing to the $f$ level. Each of rheostat members 42 are sequentially adjusted so that there is a one volt range for each level. For purposes of this invention the adjustments are ideally set so that the 41'a switch closes at a 6 volt signal with each succeeding switch closing on a one volt increase up to a ten volt level for the 41'e switch. The 42b rheostat is set for a 12 volt signal so as to indicate an oversized member such as for instance an oversized yarn wound bobbin. It should be understood that the voltages given are for purposes of illustration and should not be considered as limiting. In correlating the circuit of the analog-to-digital computer with the circuit of the photoelectric comparator it may be seen that current flowing as a result that degree of unbalance existing between photoelectric cell 39 and photoelectric cell 40 will pass through each of the series wired signal coil members 41. Depending on the intensity of the current, all of the appropriate units of reed switch members 41" will be closed, the closure being dependent upon the intensity of the current equaling the voltage setting of highest rheostat member 42.

A special circuitry is employed between the photoelectric comparator and the analog-to-digital converter, the special circuitry being the positioning of transistor members 43 and 44 between the terminal units of series wired coil members 41 and bridge amplifier tube members 36 and 37 respectively, transistor members 43 and 44 serving to match impedances and thereby protect bridge amplifier tubes 36 and 37. In order to protect transistor members 43 and 44 diode members 45 and 46 are placed in circuit between transistor member 43 and bridge amplifier tube member 36 and between transistor member 44 and bridge amplifier tube member 37 respectively. The diode members serve to protect the transistor members from reverse voltage. Completing the circuitry between diode member 46 and transistor member 43 is bias resistor member 48 and correspondingly completing circuitry between diode member 45 and transistor member 44 is bias resistor member 47. The photoelectric comparator protected by the aforementioned circuitry thus transmits current to the analog-to-digital converter which upon closure of the appropriate reed switch members transmits current to the logic network.

LOGIC NETWORK

The logic network consists of six relay members 49 (individual relay members 49 being numbered serially from $a$ to $f$), each relay member being in circuit with a corresponding level of reed switch member 41' of the analog-to-digital converter assembly. Energization of any one of relay members 49 will actuate the corresponding single-pole double-throw switch member 50 (individual switch members 50 being numbered serially from $a$ to $f$) there being a single-pole double-throw switch member 50 for each relay member 49. Power supply 52 furnishes the source of energy for relay members 49, power supply 52 being placed in circuit with relay members 49 by reed switch members 41'. The circuitry employed in conjunction with single-pole double-throw switch member 50 is unique in that energization of a plurality of relay members 49 and correspondingly the actuation of a plurality of single-pole double-throw switch members 50 will result in the completion of only a single circuit. A simple way of stating this fact is to say that there is a current output on a level that is not energized providing all levels below are energized. While for ease of illustration all switch members have been shown in their de-energized state, the function of the logic network may be more easily understood by considering the hypothetical situation wherein the current issuing from the photoelectric comparator is such as to close reed switch member 41'c. The resultant flow of current into relay member 49c of the logic network causes actuation of single-pole double-throw switch member 50c and correspondingly the actuation of single-pole double-throw switch member 50b and 50a as a result of the closure of reed switch members 41b and 51'a respectively. The flow of current however, as a result of the actuation of these three switch members, is complete to a single level and more specifically the level of the unactuated condition of single-pole double-throw switch member 50d. The power supply for this completed circuit is taken from the power supply 51 which is also employed in the actuation of the recording device. For utilization in computer system, the intelligence obtained as a result of the previously described logic network must be transformed into binary intelligence.

DECIMAL-TO-BINARY SYSTEM

The decimal-to-binary conversion system is simply a means for transforming the single input coming from the logic network into the correct number of outputs for purposes of binary intelligence. The system utilizes a plurality of standard diode matrix members 53 for providing the correct number of outputs and employs circuitry such as to channel the output to the correct point within the recording assembly.

RECORDING DEVICE

The current emanation or emanations from the decimal-to-binary system are converted from electrical pulses to mechanical energy and then to a suitable permanent type record such as for instance a punch tape by means of recording device 54 which is represented in FIGURE 2 of the drawings as a plurality of punch holes. It should be understood, however, that the recording device need not be a tape punch but may be type written intelligence of the magnetic tape type or intelligence transposed onto suitable IBM cards, or any other type of permanent record which may be conveniently fed into an electronic computer. One type of recording device which has been found to be suitable for purposes of this invention is the Fridon motorized tape punch model SP-3 manufactured by Fridon Inc. of Rochester, N.Y.

The circuitry of FIGURE 2 of the drawings employing the previously described five distinct units is actuated by switch members 55 and 56 which correspond to members 7 and 12 respectively of FIGURE 1 of the drawings. Closure of switch member 55 places power supply 57 in circuit and actuates the phtoelectric comparator circuit. Closure of switch member 56 actuates relay member 58 which closes switch member 59 placing power supply 51 in circuit, power supply 51 being employed for utilization in recording device 52 and utilization in portions of the logic network and the decimal-to-binary converter system.

In summary, the function of the photoelectric comparator of this invention may be seen in a concise manner by turning to FIGURE 3 of the drawings wherein a photoelectric comparator assembly 61 is actuated by means of switch member 67 which also places photoelectric comparator 61 in circuit with analog-to-digital assembly 64. As a result of a viewing made by photoelectric comparator 61 a signal is sent to analog-to-digital assembly 64 at which point punch switch member 62 is actuated placing tape punch member 63 in circuit. Analog-to-digital assembly 64 converts the signal from photoelectric comparator 61 into one or more signals designated as $a$, $b$, $c$, $d$, $e$ and $f$ of analog-to-digital assembly 64. The one or more pulses emanating from analog-to-digital assembly 64 are then passed into a logic network consisting of gate members 65, inhibit and gate members 66 and an inverter circuit member 68. All gate members 65 which are equal to or below the intensity of the signal from analog-to-digital assembly 64 will be actuated. However, only the corresponding highest inhibit and gate member 66, that is to say the inhibit and gate member 66 which corresponds to the highest actuated and gate member 65, will transmit a signal to decimal-to-binary assembly 69. In the event that the signal emanating from analog-to-digital assembly 64 is lower than the lowest signal which will be tolerated by and gate member 65, the signal will be transferred by inverter circuit 68 and thereby reach the decimal-to-binary assembly 69. At decimal-to-binary assembly 69 the single signal being transmitted by either inhibit and gate members 66 or inverter circuit 68 are translated into one or more signals and subsequently recorded by means of suitable mechanical operations carried out by tape punch member 63. It should be noted that tape punch member 63 and photoelectric comparator 61 are in circuit with switch member 70 which determines the initiation and termination of the mechanical cycle being analyzed such as for instance the initiation and termination of a doffing cycle. Switch member 70 also serves to initiate tape feed for tape punch member 63 thereby serving to create appropriate actuations and notations on the tape from tape punch 63. From the tape punch member, the tape 74 is supplied to a digital computer 72 wherein the information recorded thereon is stored in the memory bank of the computer. The computer 72 is the type which is capable of assimilating and storing the information from a number of tapes 74. After a number of doffs the computer is programmed or actuated to feed out a report that lists by spindle number those spindles which are producing bobbins with an average of yarns thereon less than a preselected average. This report indicates those spindles where the ends of yarn are consistently coming down due to some malfunction of the particular spindle.

That which is claimed is:

1. Apparatus to detect and record malfunctions of spindles producing yarn wound bobbins comprising: photoelectric comparing means, bobbin conveying means operably associated with said photoelectric comparing means, means mounting a plurality of bobbins on said conveying means in a predetermined position, means driving said conveying mean to move each of said bobbins past said photoelectric comparing means, a recorder, control circuit means operably associated with said photoelectric comparing means and said recorder to periodically transmit a signal from said photoelectric comparing means to said record, said recorder recording said transmitted signal and means operably associated with said recorder to detect a malfunctioning spindle from the recorded transmitted signal.

2. The apparatus of claim 1 wherein said control circuit means includes an analog-to-digital converter to convert the signal from said photoelectric comparing means.

3. The apparatus of claim 2 wherein said control circuit means further includes a logic network and a decimal-to-binary converter, said logic network receiving a signal from said analog-to-digital converter and transmitting another signal to said decimal-to-binary converter.

4. The apparatus of claim 3 wherein said recorder is a tape punch.

5. A method for detecting and recording malfunctions of spindles producing yarn wound bobbins comprising the steps of: placing said bobbins in a predetermined position, moving said bobbins sequentially past a photoelectric comparator, comparing the diameter of each of said bobbins to a standard and producing a signal therefrom, converting said signal into a binary statement, transmitting said binary statement to a recorder and recording said binary statement, supplying said recording to a detector and locating a malfunctioning spindle therefrom.

6. The method of claim 5 wherein the produced signal is converted into a decimal base statement prior to conversion into a binary statement.

7. The method of claim 6 wherein said binary statement is electrically analyzed.

References Cited

UNITED STATES PATENTS

| | | | |
|---|---|---|---|
| 2,213,664 | 9/1940 | Berg | 250—219 |
| 2,283,121 | 5/1942 | Michel | 250—219 |
| 2,510,347 | 6/1950 | Perkins | 250—219 |
| 2,926,860 | 3/1960 | Pomarico | 250—219 |
| 3,017,801 | 1/1962 | Ingber | 250—219 |
| 3,127,600 | 3/1964 | Kaenel | 340—347 |
| 3,141,057 | 7/1964 | Acton | 250—219 |
| 3,142,056 | 7/1964 | Martin et al. | 340—347 |
| 3,255,447 | 6/1966 | Sharples | 340—347 |
| 3,267,459 | 8/1966 | Chomicki et al. | 340—347 |
| 3,279,306 | 10/1966 | Balekdjian. | |

WALTER STOLWEIN, Primary Examiner

U.S. Cl. X.R.

210—219; 242—28; 340—347